United States Patent
Fendt

(10) Patent No.: US 6,526,184 B2
(45) Date of Patent: *Feb. 25, 2003

(54) ERROR-TOLERANT IMAGE COMPUTER TERMINAL

(76) Inventor: Johann Fendt, K. Ebersdorferstrasse 90/11/82, Wien 1110 (AT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,107
(22) PCT Filed: Nov. 26, 1997
(86) PCT No.: PCT/EP97/06600
    § 371 (c)(1),
    (2), (4) Date: Jun. 16, 1999
(87) PCT Pub. No.: WO98/29827
    PCT Pub. Date: Jul. 9, 1998

(65) Prior Publication Data
US 2002/0097922 A1 Jul. 25, 2002

(30) Foreign Application Priority Data
Dec. 17, 1996 (AT) .............................................. 734/96

(51) Int. Cl.⁷ .................................................. G06K 9/03
(52) U.S. Cl. ...................... 382/309; 358/407; 358/434; 358/436; 382/317; 382/321; 707/522; 707/526
(58) Field of Search ............................... 358/400–403, 358/407, 434, 436; 382/119, 185–189, 305–306, 309, 317, 321; 707/522, 526

(56) References Cited

U.S. PATENT DOCUMENTS

| | | | | |
|---|---|---|---|---|
| 4,566,127 A | | 1/1986 | Sekiya et al. ............... | 382/175 |
| 5,553,156 A | * | 9/1996 | Obata et al. ................. | 382/119 |
| 5,671,067 A | * | 9/1997 | Negishi et al. ............. | 358/403 |
| 5,742,705 A | * | 4/1998 | Parthasarathy .............. | 382/185 |
| 5,835,922 A | * | 11/1998 | Shima et al. ................ | 707/522 |
| 5,907,632 A | * | 5/1999 | Suzuki ....................... | 382/187 |
| 6,057,938 A | * | 5/2000 | Abe et al. ................... | 358/400 |

FOREIGN PATENT DOCUMENTS

| | | |
|---|---|---|
| DE | 43 07 577 | 9/1993 |
| EP | 557 886 | 9/1993 |
| WO | WO 96/24907 | 8/1996 |

* cited by examiner

*Primary Examiner*—Jose L. Couso
*Assistant Examiner*—Gregory Desire
(74) *Attorney, Agent, or Firm*—Altera Law Group, LLC

(57) ABSTRACT

Today, increased efforts are made to provide users with people-machine data-processing interfaces which are as simple and comfortable as possible. Inputting is currently carried out in data-processing systems via host terminals and personal computers as well as via other peripherals, such as network computers. However, the real evolutionary leap has been the achievement of input by means of writing and speech recognition. Handwriting in particular is a form of expression with which people are familiar from childhood onwards and which, unlike speech, also produces documented proof of expression. However, handwriting suffers from two problems: first, when there are a number of different users, as is often the case with public information access of self-service apparatus, OCR-translation of handwriting is not based on the individual script, as is necessary for a high-quality OCR process and, second, a relatively complicated correction of a defective input is demanded of the user, which, as experience has shown, clearly decreases the acceptability of a system. The invention offers a defect-tolerant image terminal as a solution to these two problems. The user-individual script forms the basis of the OCR translation process in that, during use, the script is either also input via a magnetic card or chip card or is called up in the system—this can also be achieved by means of an identification which is printed on paper or OCR-translated at the outset. It is not essential for the user to make corrections, he merely has to check the correctness of the OCR translation. Hand-written entries which have not been correctly transformed can then either be corrected by the user and re-processed or the correction can be made at the destination by sending a message, via the corresponding control key, that correction is necessary.

10 Claims, No Drawings

ERROR-TOLERANT IMAGE COMPUTER TERMINAL

BACKGROUND OF THE INVENTION

The invention comprises a terminal which in the manner of the fax apparatuses which are conventional nowadays, reads in items of image information, effects conversion into codes by way of an OCR-unit, displays the result of that conversion immediately to the user of the terminal and thereby permits him upon detecting incorrect conversion of his items of text information into codes either to repeat the input operation or however also to send an input which is not correct to the target address in such a way that he informs the receiver about the defectiveness of the conversion in order to permit manual post-processing.

Unlike the input of commands or items of information on computer installations by making use of an alphanumeric keyboard and a display screen, which is still the predominant procedure nowadays, such inputs can also be implemented by way of written, more specifically manuscript entries, on paper. The software for effecting the process for converting writing into codes is summed up by the term OCR (optical character recognition). It identifies a well-documented discipline which includes processes and procedures, methods (feature recognition, pattern recognition), error-tolerant interpolation processes (fuzzy logic) and technical aspects of data compression, optimisation of implementation times etc.

The technology of OCR however encounters natural limits which exclude completely error-free results; on the one hand human handwriting has script images which are individual to a person and on the other hand it is not always unchanged even in relation to the same person, at different times.

This represents a serious obstacle in regard to the use of manuscript or handwriting as an input instrument; even very low error rates which will never be entirely eliminated hitherto made it impossible to put such terminals to practical use. Otherwise in many cases, in particular in the area relating to simple everyday uses as occur for example in the self-service sector in banks, such terminals would already long ago have made greater inroads into use of the equipment of keyboard and display screen. The psychological advantage of handwriting input is also that the input medium, that is to say the form, remains in the hands of the user in its original as a physical evidence and documentation of that which was communicated to the input unit as a command.

In order to illustrate the hitherto state of the art, insofar as it is to be deemed useful for comprehension of the present invention, a brief outline of the development of input peripheral units will be set forth. The Seventies were in the sign of the large computers to which inputs or commands were communicated by way of 'unintelligent' terminals. In the Eighties the Personal Computer began its triumphal march, a piece of equipment of high decentral intelligence, which was also very quickly used as a decentral peripheral unit and extensively displaced the other terminals.

It is precisely in regard to that function however which increasingly gained in significance that the weaknesses and problems of the PC manifested themselves. The PC is basically both too complicated and also too expensive just for communicating simple inputs and commands to central computers (hosts and servers). In that respect, not only equipment supply costs but more also maintenance costs and also the level of obsolescence which is high due to fast system and product cycles play their part. As from about the year 1995 such realisations led to the development of 'lean clients'. The expectation is that they will win through, for cost reasons, particularly in relation to simple uses. More specifically, users are either not always in a position or not always prepared to satisfy high demands in terms of operating know-how. In regard to everyday processes in the self-service sector and also information access procedures, for example over the Internet, in the long term simple processes involving easy comprehensibility, simple handling and rapid implementation will win through. Even users who are accustomed to more complicated operating procedures, for example on a PC, will prefer the simpler technology if the straightforward use of the application is the foreground consideration and not the play component of operation which is also inherent in the PC, if therefore there is a realistic weighing-up of cost and use.

The experiences and realizations of recent years have resulted in two evolutionary developments. First, the symbol-oriented graphic user interface together with an expansion of the keyboard, by virtue of mouse operation, has made computer technology easier and more user friendly. Second, the development of personal computers (PC's) that provide a simpler and less expensive alternative to ever increasing high-capacity centralized computers, has allowed computer technology to promulgate.

These experiences and realisations resulted in recent years in two evolutionary developments. On the one hand, the symbol-oriented graphic user interface together with an expansion of the keyboard by virtue of mouse operation, in the meantime the virtually monopoly domain of Microsoft. Secondly, the development of so-called 'lean clients' as a simpler and in particular less expensive alternative to ever increasingly high-capacity decentral computers, that is to say PCs.

Today, in the strategically crucial area of information technology, the man-machine interface, we are faced with revolutionary developments, more specifically communication of man with machine by way of speech and also by way of handwriting. On a world-wide basis, great endeavours are being undertaken to achieve advances in this area— nonetheless an interface design which is as user-close as possible will afford a quantum leap in many application areas.

Speech and handwriting input can be viewed as equivalent processes, even if each has its own different advantages and disadvantages and therefore application areas which are rather complementary. In regard to preferences for the two methods, there is a marked difference: while in European and American research and development, the talk is exclusively of 'speech input', the Japanese electrical and electronic industry is targeted predominantly on 'writing input technology'. That reflects cultural differences. While in the West a high level of affinity for abstract thought prevails, which devotes itself to virtual space, Japanese thinking is more concrete and practice-oriented and more remote from theory. A significant economic consequence thereof was the fact that the fax apparatus was developed in Europe but taken up in Japan and from there was made into a worldwide market success.

Virtually all known patents in the field of writing processing are Japanese, more specifically for many years now, from the introduction of the fax apparatus. It may be that this Japanese dominance, this advance in development, was also a reason why Western research fell back into the area of speech and 'writing recognition' is not a theme that is involved there. The converse is not the case. There is greatly advanced Japanese research and development in the field of 'speech recognition', and for that reason it must also be reckoned that this technology will first be applied in Japan; from the point of view of its structure and its auditory aspects the Japanese language is many times easier to detect by machine than Western languages.

The most recent trend in development towards 'lean clients' in combination with handwriting process has directed Japanese research and development to a technology and equipment which would open up attractive possible uses; the known fax unit, unused in its potential function as a 'lean' input peripheral unit, transports writing and thus potential control commands or items of input information. In that case the writing or text can be converted into codes either at the transmission location or at the target location, by means of OCR. If the conversion operation is moved into the target system, it would be possible for all presentday fax apparatuses to perform world-wide the function of terminals and thus play a part beside PCs or new but nonetheless conventional peripheral units such as network computers.

The largest Japanese electrical group, Hitachi, has long been experimenting with mainframes which are intended to process writing or text input of normal fax apparatuses and which would thus make each fax apparatus into an 'answer-back fax apparatus'. An obstacle in terms of exploitation of licences however is thought to have been the experience that the defectiveness of OCR-conversion stands in the way of proper operational fitness. Prototypes produced by Western manufacturers, with the option of correcting residual errors by way of a keyboard and a display screen on the other hand suffer from the point that this again involves a relapse to a lower level of input peripheral equipment and thus a limited degree of user acceptance.

A further process from Matsushita integrates a correction keyboard for OCR-conversion into a fax apparatus, but basically this does not represent a substantial advance over pure keyboard (and display screen) input.

SUMMARY OF THE INVENTION

The development according to the invention of the present system lies in a combination of a—apparently—difficult prerequisite for a qualitatively satisfactory OCR-process on the one hand and an organisational innovation on the other hand which is made possible by virtue of a technical arrangement. Both are described hereinafter.

Anyone who uses OCR-software knows that results which are satisfactory to a certain extent can only be achieved when the individual handwriting pattern of the user forms the basis for the OCR-process. The user firstly has to initialise the software by training it for his individual writing image or script. In the area of speech recognition, that consideration is the primary content of research: acoustic training of the system with the individual manner of speaking of the user is of greatest importance for successful use.

In regard to writing processing also therefore the individual handwriting pattern must be communicated to the system. In general therefore it will be necessary for each user to fill in by hand a pattern form in order to use that pattern, which is individual to the respective person, for the OCR-program in the situation of use. In many areas of use however it will be possible to derive that handwriting pattern from a large number of writing uses of a user and store same for that person, for example in connection with bank remittances and transactions.

The operation of calling up the customer-specific writing image in the situation of use can be effected by way of a magnetic or chip card, whether the writing pattern itself is stored thereon or the writing pattern is called up with an identification number from the memory of the system hardware. The latter can also be effected by way of the account number which is printed on the form and which is first subjected to OCR-translation. This second alternative also represents the single option for improving quality, which is available for the Hitachi system.

The further technical-organisational innovation of the process the subject-matter of the present invention provides that no obligatory correction of a possibly defective input is required from the user. A second working step, namely correction of the input, in whatever form that may be, can be omitted, whereby the level of acceptance can be certainly substantially increased. The user is only required to check the printout of the OCR-translation of his manuscript form. In the positive case, he will press the key 'OK—execute'; if in contrast he notes a defective translation on the printed-out document, he will press the other key 'error—execute after manual correction by system operator'. In that case, confirmation is printed out that the input declared to be defective will also be subjected to post-processing in the system. This second step in the invention could admittedly also be effected without the first step of calling up the customer-individual writing pattern, but there is then the fear that this will involve a hit rate which is unsatisfactory both for the customer and also for the system operator.

Further processing of erroneous or defective inputs which are not corrected by the user is then implemented in a similar manner to presentday processing by virtue of manual input or subsequent procedures, but here this is supported by the preliminary work which has already been done by the system: the human dealing with the processing operation already has available the translation which in fact is predominantly correct, and it will be possible to quickly discover and correct the error by comparison with the original.

In this process therefore achieving freedom from error which is required for the processing procedure is not necessarily a matter for the user. This is important in terms of acceptance everywhere that there is no motive for particular care or attention on the part of the user. In what fields and in relation to which situations of use it will be possible also to require a user to deal with correction, besides a pure checking procedure which the user will still willingly undertake, and whether and how that correction process is to be stimulated (for example by differences in terms of the charges involved), is a question of supplier-customer relationships, the situation in terms of competition, and marketing.

One particular embodiment of the invention is directed to a fax apparatus for transmitting and receiving documents. The documents in question are at least partially handwritten. The fax apparatus includes at least the following equipment: a scanning unit for scanning image information disclosed on the document that is to be transmitted, an (optical character recognition) OCR unit for converting the scanned image information into codes, a transmitting unit for transmitting the codes which are converted by the OCR-unit, a receiving unit for receiving transmitted documents, and a printing unit for printing out the documents.

There is also included a writing image input and storage unit for the input of user-individual writing images and for storage of the user-individual writing images in suitable form. An individual's characteristic handwriting symbols or images are input and stored as user-individual writing images. There is provided a call-up unit for user-individual call-up of a user-individual writing image in the writing image input and storage unit. Once input and stored, an individual's handwriting symbols are accessible from the storage unit.

What is claimed is:

1. A fax apparatus for transmitting and receiving documents which in particular have at least in part handwritten components, including a scanning unit for scanning the image information of such a document to be transmitted, an OCR-unit for converting the scanned image information into codes, a transmitting unit for transmitting the codes which are converted by the OCR-unit, a receiving unit for receiving transmitted documents, and a printing unit for printing out documents, wherein there is provided a user-individual handwriting-pattern input and storage unit for the input of a user-individual handwriting-pattern and for storage of the user-individual handwriting-pattern in suitable form, that there is provided an optional call-up unit for user-individual call-up of a user-individual handwriting-pattern out of the user-individual handwriting-pattern input and storage unit communicating the user-individual handwriting-patten to the OCR-unit, that there is further provided an intermediate storage means which stores the converted codes which are converted by the OCR-unit on the basis of the user-individual handwriting-pattern from the scanned image information and, that there is a data transmission connection between the OCR-unit and the printing unit so that the converted codes from the image information converted back into image information again by the OCR-unit, immediately after they have been produced and converted back, can be printed out by means of the printing unit, and that there is provided an erasing unit for erasing (not for correcting) the converted codes stored in the intermediate storage means and, a confirmation unit with which the codes stored in the intermediate storage means can be called up from the intermediate storage means for transmission by means of the transmitting unit.

2. The fax apparatus according to claim 1, wherein the call-up unit is a card reading unit for reading magnetic or chip cards.

3. The fax apparatus according to claim 2, wherein there is provided a display device for displaying the codes which are converted from the image information and converted back into items of image information again by the OCR-unit, immediately after they are produced.

4. The fax apparatus according to claim 1, wherein there is provided a display device for displaying the codes which are converted from the image information and converted back into items of image information again by the OCR-unit immeadiately after they are produced.

5. The fax apparatus according to claim 1, wherein the confirmation unit demands a confirmation result, "OK-execute" or "error—execute after manual correction by system operator", for the converted codes from the user.

6. A method of transmitting documents which in particular have at least in part user-individual handwritten components, wherein the document is scanned by means of a scanning unit and, the scanned image information is converted into codes by means of an OCR-unit wherein the codes converted by the OCR-unit are transmitted by means of a transmitting unit and, wherein documents transmitted are received by means of a receiving unit and printed out by means of a printing unit, wherein prior to the transmission of documents user-individual handwriting-patterns are inputted and stored in suitable form and that conversion of the image information scanned by the scanning unit into codes is effected by means of the OCR-unit optionally on the basis of the stored user-individual handwriting-patterns and that the codes converted by the OCR-unit are then converted into image information again by the OCR-unit and printed out by means of the printing unit, wherein confirmation of the converted codes is performed prior to transmission and an erasing unit is used to erase the converted codes.

7. The method according to claim 6, wherein the stored user-individual handwriting-patterns can be called up by means of magnetic or chip cards.

8. The method according to claim 7, wherein the codes which are produced by the OCR-unit on the basis of the user-individual handwriting-patterns and converted back into items of image information again are displayed by means of a display device, immediately after they are produced.

9. The method according to claim 6, wherein the codes which are produced by the OCR-unit on the basis of the user-individual handwriting-patterns and converted back into items of image information again are displayed by means of a display device, immediately after they are produced.

10. The method according to claim 6, wherein there is a demand from a confirmation unit for a confirmation result, "OK- execute" or "error—execute after manual correction by system operator", for the converted codes from the user.

* * * * *